(12) United States Patent  
Yoshimura

(10) Patent No.: US 7,407,192 B2  
(45) Date of Patent: Aug. 5, 2008

(54) VEHICLE END STRUCTURE

(75) Inventor: Motonobu Yoshimura, Zama (JP)

(73) Assignee: Nissan Motor Co., Ltd., Yokohama (JP)

(*) Notice: Subject to any disclaimer, the term of this patent is extended or adjusted under 35 U.S.C. 154(b) by 295 days.

(21) Appl. No.: 11/168,342

(22) Filed: Jun. 29, 2005

(65) Prior Publication Data

US 2006/0001228 A1 Jan. 5, 2006

(30) Foreign Application Priority Data

Jul. 1, 2004 (JP) ............... 2004-195365

(51) Int. Cl.  
*B62D 21/15* (2006.01)

(52) U.S. Cl. ............... 280/784; 280/124.109; 296/187.09

(58) Field of Classification Search .......... 280/124, 280/109, 781, 784, 797, 798; 180/232, 281, 180/902, 299, 271, 274; 296/35.2, FOR. 112, 296/FOR. 113, 187.03, 187.09, 187.01; 188/371, 188/377; 52/735.1

See application file for complete search history.

(56) References Cited

U.S. PATENT DOCUMENTS

| | | | | |
|---|---|---|---|---|
| 3,129,954 | A * | 4/1964 | Duero et al. ............... | 280/792 |
| 4,152,012 | A * | 5/1979 | Reidelbach et al. ......... | 280/784 |
| 5,429,388 | A * | 7/1995 | Wheatley et al. ............ | 280/784 |
| 5,466,033 | A * | 11/1995 | Murakami et al. ......... | 296/203.02 |
| 5,562,308 | A | 10/1996 | Kamei et al. | |
| 5,913,565 | A * | 6/1999 | Watanabe ............... | 296/187.03 |
| 6,003,934 | A * | 12/1999 | Usui ..................... | 296/203.02 |
| 6,109,654 | A * | 8/2000 | Yamamoto et al. .......... | 280/784 |
| 6,705,668 | B1 * | 3/2004 | Makita et al. ........... | 296/187.03 |
| 6,736,448 | B2 * | 5/2004 | Hanakawa et al. ....... | 296/187.09 |
| 6,808,039 | B2 * | 10/2004 | Roehringer et al. ......... | 180/312 |
| 6,893,078 | B2 * | 5/2005 | Saeki .................... | 296/187.09 |
| 7,144,039 | B2 * | 12/2006 | Kawasaki et al. ........... | 280/784 |
| 2005/0279049 | A1 * | 12/2005 | MacKenzie et al. ........ | 52/730.4 |

FOREIGN PATENT DOCUMENTS

| | | |
|---|---|---|
| CN | 1162291 A | 10/1997 |
| CN | 1421347 A | 6/2003 |
| JP | H11-348824 | 12/1999 |
| JP | 2002-356181 A | 12/2002 |

* cited by examiner

*Primary Examiner*—Ruth Ilan  
*Assistant Examiner*—Drew J. Brown  
(74) *Attorney, Agent, or Firm*—Global IP Counselors, LLP

(57) ABSTRACT

A vehicle end structure comprises a pair of side frame members disposed at a longitudinal end portion adjacent to a cabin and a suspension support member disposed below the side frame members in a portion adjacent to the cabin. A pair of pressure receiving members is provided that are fixedly coupled to the suspension support member and extend toward a longitudinal end of the vehicle in direction substantially parallel to the side frame members. Thus, the vehicle end structure is configured and arranged to minimize the influence on the cabin even when collision energy is inputted from the longitudinal end of the vehicle.

14 Claims, 7 Drawing Sheets

VEHICLE END STRUCTURE

CROSS-REFERENCE TO RELATED APPLICATIONS

This application claims priority to Japanese Patent Application No. 2004-195365. The entire disclosure of Japanese Patent Application No. 2004-195365 is hereby incorporated herein by reference.

BACKGROUND OF THE INVENTION

1. Field of the Invention

The present invention relates to a vehicle end structure. More specifically, the present invention relates to a vehicle end structure configured and arranged to effectively absorb collision energy during a vehicle front or rear collision and to minimize the influence of the collision energy on a cabin of the vehicle.

2. Background Information

Japanese Laid-Open Patent Publication No. 2002-356181 discloses a conventional vehicle end structure as applied to a front end portion of a vehicle. In this reference, the vehicle is provided with a pair of left and right front side frames that is build into a cabin of the vehicle to form a frame of a vehicle body in the front end portion of the vehicle. A crossbar member for linking the left and right front side frames is disposed at the distal front ends thereof so that a front bumper is coupled to a front portion of the crossbar member via a bracket.

The front bumper is configured and arranged to absorb energy when collision energy is applied from the front side of the vehicle during front collision and the like, but when the collision energy that is too large for the front bumper to absorb completely is inputted, part of the collision energy is transmitted to the front side frames connected to the front bumper. In such case, the front side frames are compressed and deformed in the axial direction, whereby absorbing the collision energy. Therefore, the effect of the collision energy on the cabin of the vehicle can be minimized, and protection of passengers in the cabin can be achieved.

In view of the above, it will be apparent to those skilled in the art from this disclosure that there exists a need for an improved vehicle end structure. This invention addresses this need in the art as well as other needs, which will become apparent to those skilled in the art from this disclosure.

SUMMARY OF THE INVENTION

In recent years, there has been an urgent need for developing a vehicle end structure that can reduce the effect of the collision energy inputted to a vehicle to which the own vehicle is collided (the other vehicle in the collision) as well as reducing the effect of the collision energy imparted to the own vehicle.

The present invention was conceived based on such demands as described above. One object of the present invention is to provide a vehicle end structure in which the influence of the collision energy inputted from an end portion of a vehicle can be effectively reduced both in the own vehicle and in the other vehicle in the collision.

In order to achieve the above mentioned object and other objects of the present invention, a vehicle end structure is provided that basically comprises first and second side frame members, a suspension support member, first and second pressure receiving members. The first and second side frame members longitudinally extend from a portion adjacent to a cabin of a vehicle to a longitudinal end portion of the vehicle. The suspension support member is disposed below the first and second side frame members in the portion adjacent to the cabin of the vehicle. The first and second pressure receiving members are coupled to the suspension support member and extending toward the longitudinal end portion of the vehicle in directions substantially parallel to the first and second side frame members, respectively.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 2(*b*) is a partial left side elevational view of the left pressure receiving member illustrated in FIG. 2(*a*) in accordance with the preferred embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
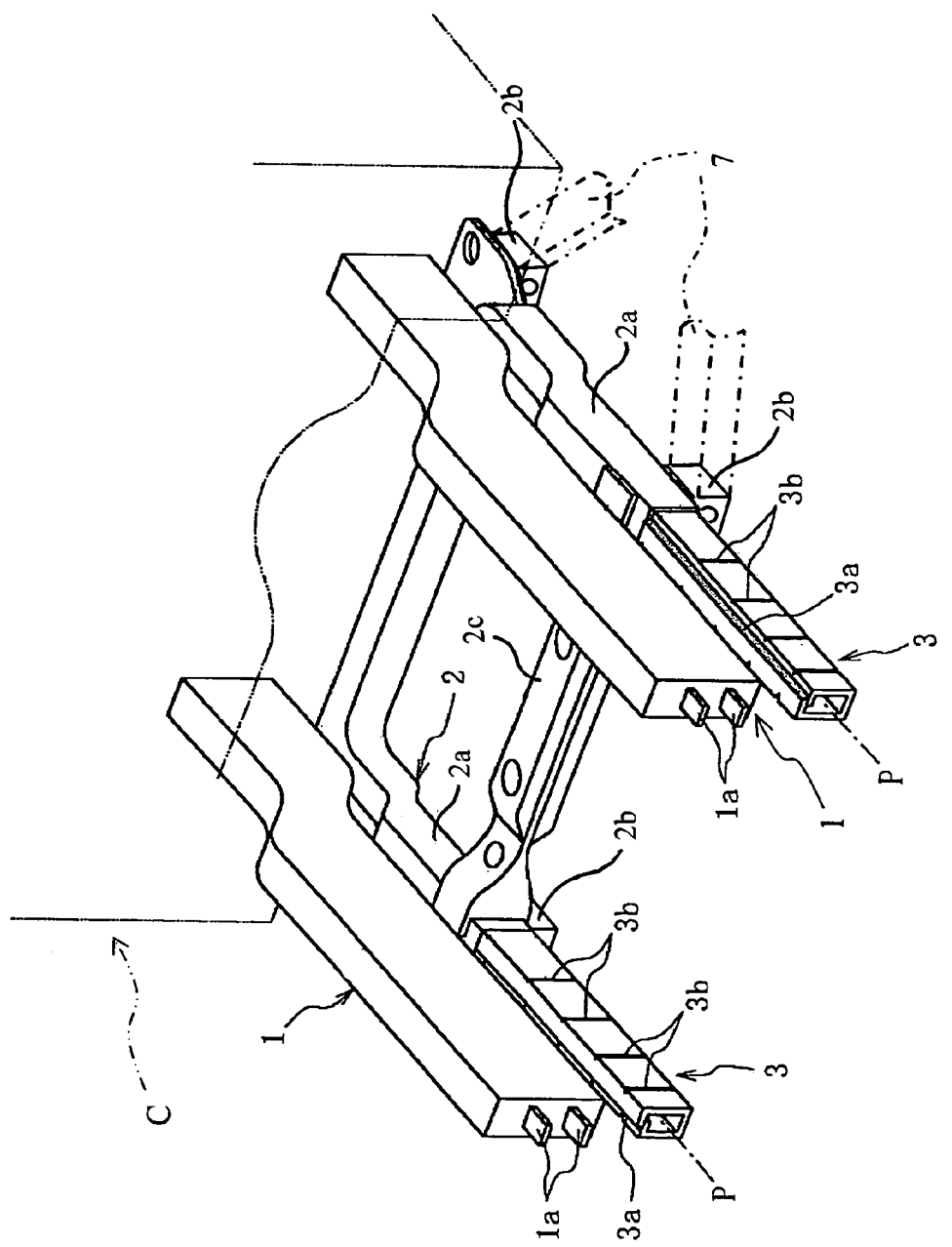
FIG. 1 is a simplified diagrammatic view of a vehicle end structure as applied to a vehicle front end portion in accordance with a preferred embodiment of the present invention.

Referring initially to FIG. 1, a vehicle end structure is illustrated in accordance with a preferred embodiment of the present invention. FIG. 1 is a simplified diagrammatic front perspective view of the vehicle end structure in accordance with the preferred embodiment illustrating the vehicle end structure is applied to a front end portion of a vehicle. Although, in the preferred embodiment of the present invention, the vehicle end structure is explained as being applied to the vehicle front end portion, it will be apparent to those skilled in the art from this disclosure that the vehicle end structure of the present invention can also be applied to a rear end portion of a vehicle.

As seen in FIG. 1, the front end portion of the vehicle is provided with a pair of left and right front side frame members 1 (first and second side frame members) extending from a front portion of a vehicle cabin C to a longitudinal end portion (front end portion) of the vehicle, and a suspension support member 2 disposed below rear end portions (adjacent to the cabin C) of the front side frame members 1. In the preferred embodiment of the present invention, the left and right side frame members 1 and the cabin C are preferably integrally formed to constitute a part of a unibody type structure of the vehicle. Of course, it will be apparent to those skilled in the art from this disclosure that the vehicle end structure of the present invention can be applied to the chassis on frame type vehicle.

The suspension support member 2 preferably comprises a pair of left and right longitudinal parts 2a that extend in a direction substantially parallel to the left and right front side frame members 1, respectively. The longitudinal parts 2a of the suspension support member 2 are preferably arranged as rigid structural members formed by, for example, metal or the like. Moreover, each of the longitudinal parts 2a is preferably provided with at least one suspension attachment part 2b configured and arranged to be coupled to a suspension member 7 such as a lower suspension arm (shown with a dash dot line in FIG. 1) of a suspension (not shown). The suspension attachment part 2b is preferably configured and arranged such that the suspension member 7 is movable at least in a vertical direction with respect to the suspension support member 2 so that the suspension insulates a vehicle body from shocks transmitted through front wheels. Any type of the suspension with the appropriate type of the suspension attachment parts can be utilized in the vehicle end portion of the present invention as long as the suspension support member 2 is configured and arranged to support a structural component of the suspension. Moreover, in the first embodiment of the present invention, the suspension support member 2 preferably includes a transverse section 2c that extends between the left and right longitudinal parts 2a as seen in FIG. 1.

The vehicle end structure of the present invention further comprises a pair of left and right pressure receiving members 3 (first and second pressure receiving members) that is fixedly coupled to distal end portions (i.e., longitudinal end portions that are disposed farther from the cabin C) of the left and right longitudinal parts 2a of the suspension support member 2, respectively, as seen in FIG. 1. More specifically, the left and right pressure receiving members 3 are preferably coupled to the left and right longitudinal parts 2a, respectively, by a weld (shown in FIG. 3) or bolts (shown in FIG. 4). Alternatively, the left and right pressure receiving members 3 can be integrally formed with the left and right longitudinal parts 2a of the suspension support member 2, respectively, as a one-piece, unitary member. The left and right longitudinal parts 2a are arranged to extend substantially along the left and right front side frame members 1, respectively, toward the front end of the vehicle as seen in FIG. 1. In other words, the left and right pressure receiving members 3 extend from the left and right longitudinal parts 2a of the suspension support member 2 in a direction substantially parallel to the left and right front side frame members 1, respectively.

The left and right pressure receiving member 3 are basically identical except for they are mirror images of each other. Therefore, only one of the left and right pressure receiving members 3 is illustrated to explain the structures of the left and right pressure receiving members 3 herein.

Figure 2A:
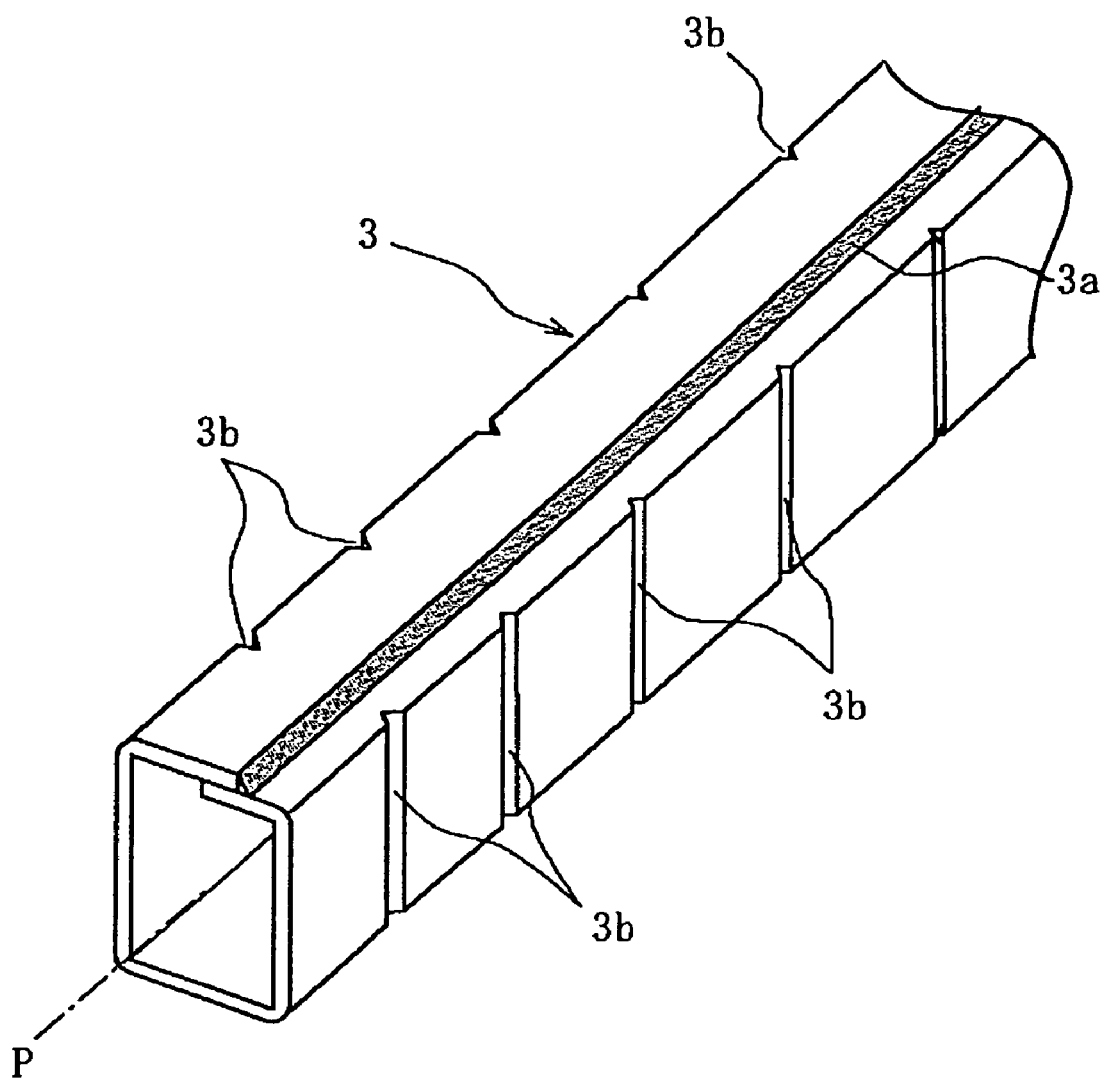
FIG. 2(*a*) is an enlarged partial front perspective view of a left pressure receiving member of the vehicle end structure illustrated in FIG. 1 in accordance with the preferred embodiment of the present invention.
Figure 2B:
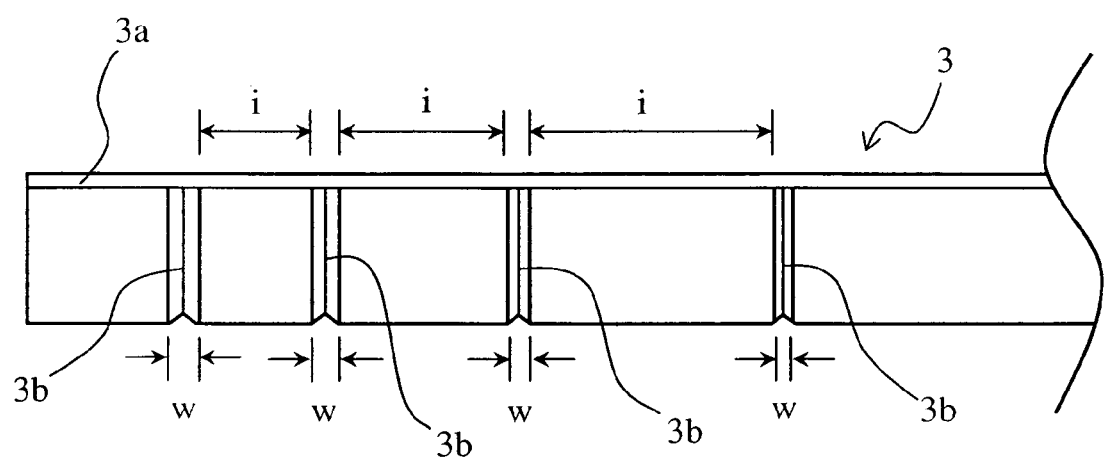

FIG. 2(a) is an enlarged partial front perspective view of the left pressure receiving member 3. FIG. 2(b) is a simplified left side elevational view of the left pressure receiving member 3. As seen in FIG. 2(a), the pressure receiving member 3 is preferably formed with a hollow body having a generally rectangular closed cross sectional shape. Moreover, the pressure receiving member 3 has a joint section 3a extending longitudinally as seen in FIG. 2(a). The pressure receiving member 3 is preferably formed as a one-piece, unitary member by folding a plate member (e.g., a sheet metal) at four folding lines so that a first widthwise edge portion is superposed on a second widthwise edge portion, and the first and second widthwise edge portions are joined together to form the joint section 3a. As seen in FIG. 2(a), the joint section 3a is preferably disposed on a top wall surface of the pressure receiving member 3. Thus, at least the side walls and the bottom wall of the pressure receiving member 3 extend continuously to form a continuous wall section as seen in FIG. 2(a).

Since the joint section 3a is formed by, for example, welding the first and second widthwise edge portions of the plate member together, the joint section 3a is preferably disposed directly under the front side frame members 1 as seen in FIG. 1. In other words, the joint section 3a is preferably disposed on the top wall surface of the pressure receiving member 3 as mentioned above. Therefore, water is prevented from accumulating and rust is prevented from forming in the welded areas of the joint section 3a.

As shown in FIG. 2(a), the pressure receiving member 3 preferably includes a plurality of deformation structures 3b. In the first embodiment of the present invention, each of the deformation structures 3b is preferably formed as a notch or bead that extends in a direction substantially orthogonal to a center axis P of the pressure receiving member 3. The deformation structures 3b are preferably spaced apart from each other in a direction parallel to the center axis P as seen in FIG. 2(a). The deformation structures 3b are preferably provided to all the wall surfaces of the pressure receiving member 3 except for the wall surface on which the joint section 3a is provided (e.g., the top wall surface in FIG. 2(a)). In other words, the deformation structures 3b are preferably provided on the side walls and the bottom wall of the pressure receiving member 3. The deformation structures 3b are preferably configured and arranged to allow the pressure receiving member 3 to deform along the center axis P of the pressure receiving member 3 so that the collision energy is absorbed as the pressure receiving member 3 deforms when the collision energy is inputted from the front side of the vehicle.

Moreover, as seen in FIG. 2(b), the deformation structures 3b are preferably formed so that a width w of the deformation structure 3b gradually decreases from the distal end portion (i.e., the portion farther from the cabin C) to the proximal end portion (i.e., the portion closer to the cabin C) of the pressure receiving member 3. Moreover, the deformation structures 3b are preferably spaced apart such that an interval i between two adjacent deformation structures 3 gradually increases from the distal end portion to the proximal end portion of the pressure receiving member 3 as seen in FIG. 2(b).

Referring back to FIG. 1, the front side members 1 are provided with brackets 1a at the distal end portions thereof so that a front bumper or a front end module (not shown) is coupled to the distal end portions of the front side frame members 1 via the brackets 1a. Therefore, a collision energy inputted from the front side of the vehicle is absorbed by the front bumper and the front side frame members 1. Moreover, in the present invention, since the pressure receiving members 3 are provided that are coupled to the suspension support member 2, the collision energy is also absorbed in the pressure receiving members 3. Therefore, the surface pressure at the time of collision can be reduced, and the effects of the collision energy to both the cabin C of the own vehicle and a cabin of the vehicle to which the own vehicle collided can be minimized.

Figure 3:
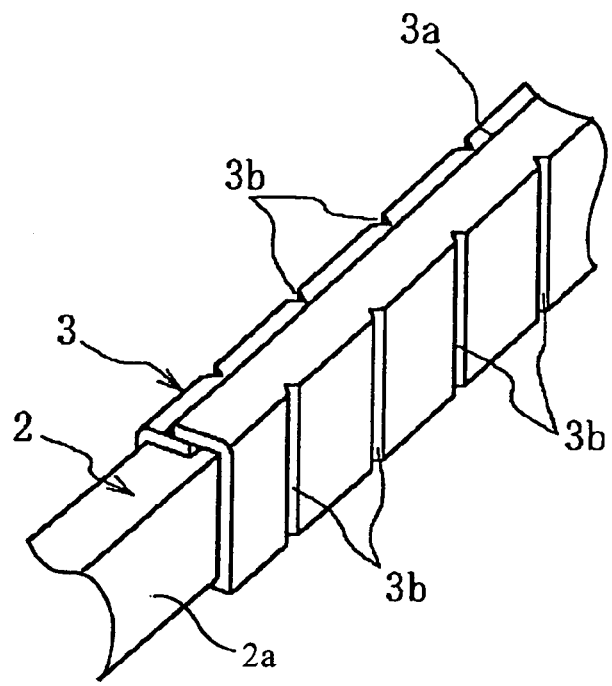
FIG. 3 is an enlarged rear perspective view illustrating an area in which the pressure receiving member is connected to a suspension support member in accordance with the preferred embodiment of the present invention.
Figure 4:
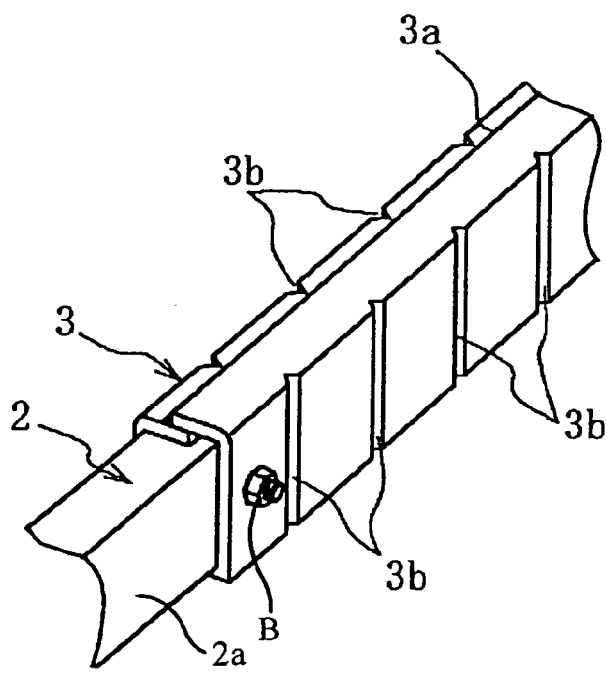
FIG. 4 is an enlarged rear perspective view illustrating an area in which the pressure receiving member is connected to the suspension support member in accordance with an alternative structure of the preferred embodiment of the present invention.

As mentioned above, the pressure receiving member 3 is preferably fixedly coupled to the longitudinal part 2a of the suspension support member 2 by a weld as shown in shown in FIG. 3, or by a bolt fastening using a bolt unit B as shown in FIG. 4. Thus, the pressure receiving members 3 that have an appropriate size and structure according to different vehicle structures or vehicle variations can be provided. Also, as mentioned above, the pressure receiving members 3 can also be arranged to be integrally formed with the suspension support member 2 as a one-piece, unitary member.

Figure 5:
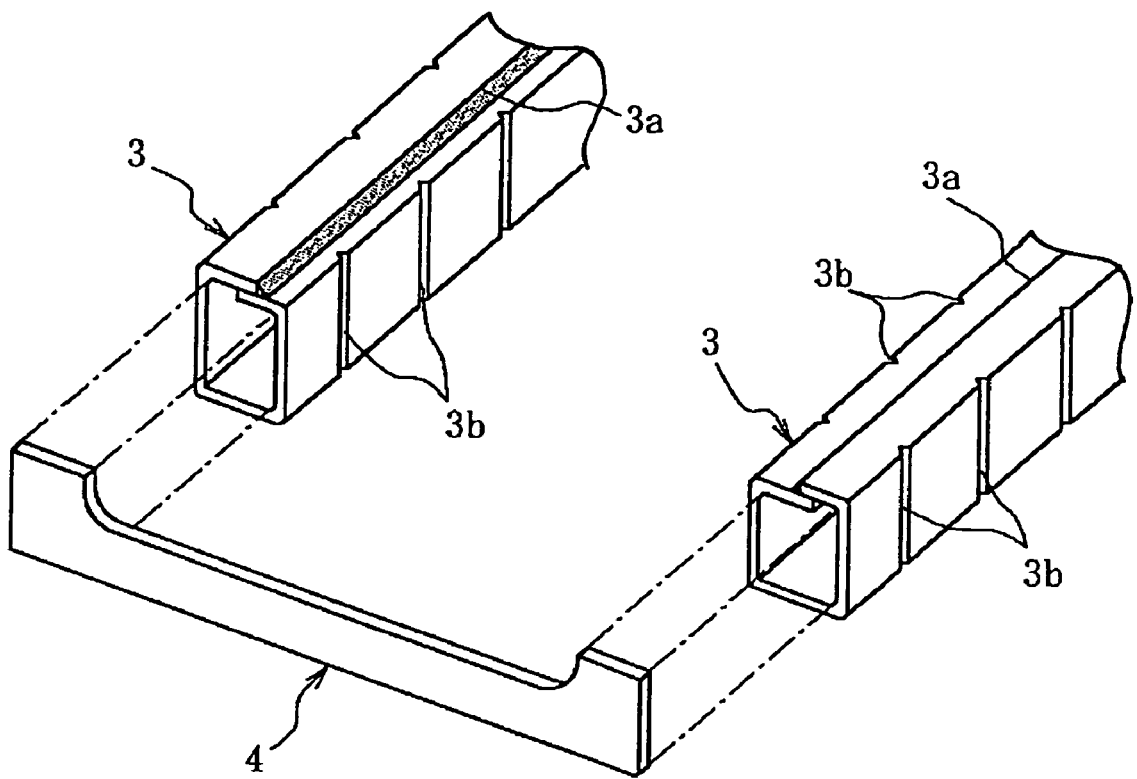
FIG. 5 is a front perspective view of distal end portions of the pressure receiving members illustrating a connecting arrangement between the pressure receiving members and a crossbar member in accordance with the preferred embodiment of the present invention.

FIG. 5 is a simplified partial front perspective view showing only the distal end portions of the pressure receiving members 3. As seen in FIG. 5, the vehicle end structure of the present invention can be arranged to include a crossbar member 4 extending between the distal end portions of the pressure receiving members 3 for coupling the pressure receiving members 3. The crossbar member 4 is configured and arranged to prevent the left and right pressure receiving members 3 from opening (bending) toward left and right, respectively, during a vehicle collision. Therefore, with the crossbar member 4, the impact of the collision can be absorbed efficiently by the pressure receiving members 3, and the energy associated with the collision can be dispersed.

As mentioned above, the deformation structures 3b of the pressure receiving members 3 are configured and arranged to cause the pressure receiving members 3 to preferentially compress and collapse together with the front side frame members 1 when the collision energy is inputted to effectively absorb the collision energy. Of course it will be apparent to those skilled in the art from this disclosure that the shape of each one of the deformation structures 3b is not limited to the one shown in FIGS. 2 to 5. Any shape of the deformation structures 3b can be used as long as the deformation structures 3b are located in the wall surfaces (e.g., the side walls and the bottom wall) in which the joint section 3a is not provided and as long as the deformation structures 3b are formed to effectively deform the pressure receiving members 3 to absorb the collision energy as described above.

Figure 6:
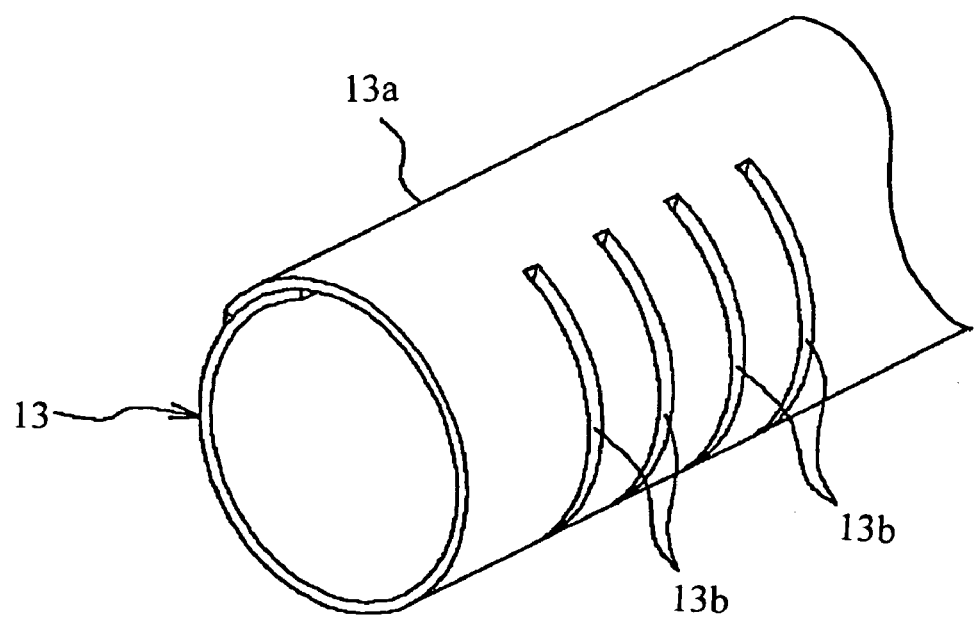
FIG. 6 is an enlarged partial front perspective view of a pressure receiving member in accordance with a first alternative structure of the vehicle end structure in accordance with the preferred embodiment of the present invention.

The pressure receiving members 3 were explained above as having the hollow body with the generally rectangular cross section, and as being formed by folding a plate member at four folding lines and by joining the first and second widthwise edge portions in a single joint section 3a. However, the structure and shape of the pressure receiving members 3 are not limited to such arrangement. For example, a plate member may also be formed into a hollow body having a generally circular cross section by a bending process to form a pressure receiving member 13 as shown in FIG. 6. In such case too, a plurality of deformation structures 13 are preferably provided in the similar manner as explained referring to FIG. 2(b).

Figure 7:
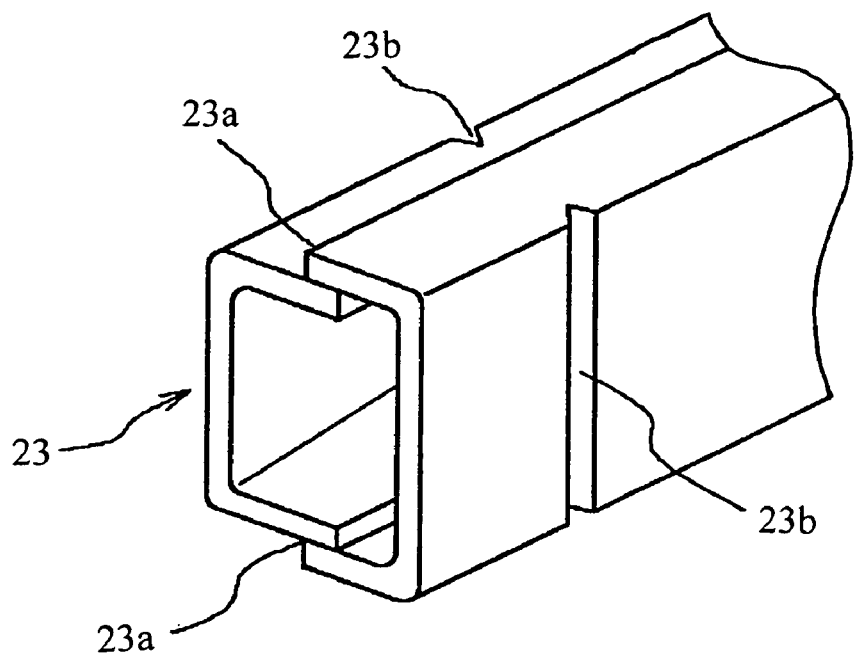
FIG. 7 is an enlarged partial front perspective view of a pressure receiving member in accordance with a second alternative structure of the vehicle end structure in accordance with the preferred embodiment of the present invention.

Alternatively, two plate members can be used to form a pressure receiving member 23 as seen in FIG. 7. In such case, each of the plate members is preferably folded into a U-shape member, and one of the U-shaped members is fitted into the other one of the U-shape member such that opening portions of the U-shape members face each other. Thus, the pressure receiving member 23 preferably has two joint sections 23a disposed top and bottom wall surfaces of the pressure receiving member 23 as shown in FIG. 7. In such case too, a plurality of deformation structures 23b are preferably provided on wall surfaces of the pressure receiving member 23 that do not have the joint sections 23a (i.e., the side wall surfaces).

Figure 8:
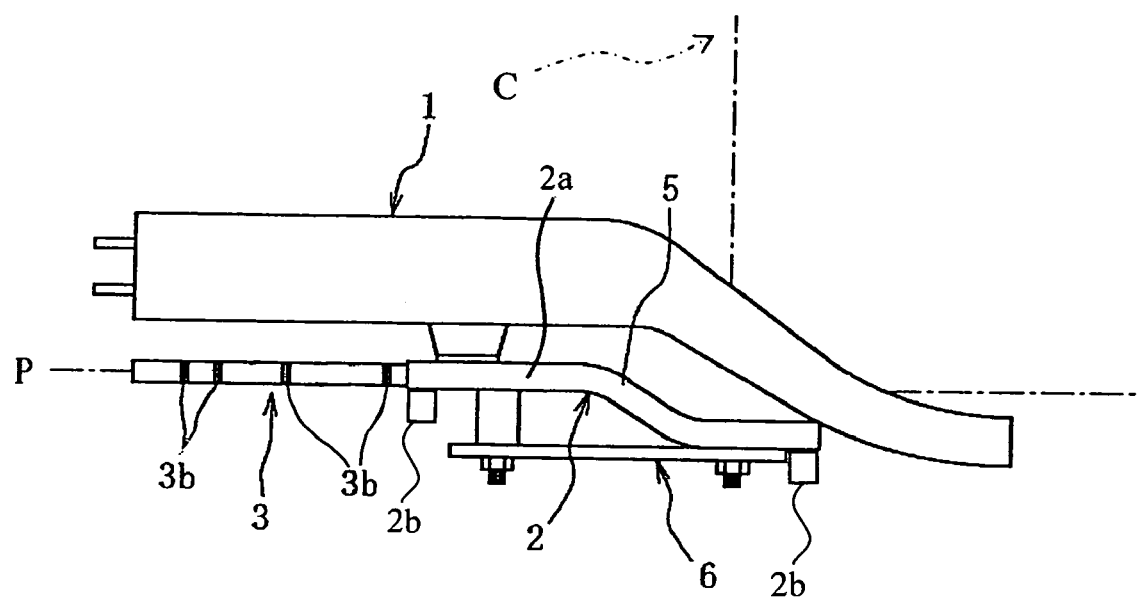
FIG. 8 is a simplified diagrammatic side elevational view of the vehicle end structure which is provided with a reinforcement member in accordance with the preferred embodiment of the present invention.

FIG. 8 is a simplified left side view of the vehicle front end portion illustrating the left front side frame member 1 and the left longitudinal part 2a of the suspension support member 2 illustrated in FIG. 1, and a reinforcement member 6 coupled to the suspension support member 2. When the rear end portions of the front side frame members 1 are arranged to be concealed beneath the cabin C as seen in FIG. 8, the longitudinal parts 2a of the suspension support member 2 are also molded to have curved portions 5 (only left side curved portion 5 is shown in FIG. 8) that are shaped to conform to the shape of the front side frame members 1.

In the suspension support member 2 having the curved portions 5, there is a risk that the collision energy is concentrated in the curved portions 5, and that breakage may occur at the curved portions 5 when the collision energy is inputted through the pressure receiving members 3. Accordingly, the reinforcement member 6 is preferably provided to the suspension support member 2 as shown in FIG. 8 when the suspension support member 2 has the curved portions 5.

The reinforcement member 6 is preferably formed with a plate-shaped member coupled to the suspension support members 3 such that a main surface of the plate-shaped member is substantially parallel to the center axes P of the pressure receiving members 3. Alternatively, the reinforcement member 6 can be arranged as a rod-shaped member disposed such that a longitudinal axis of the reinforcement member 6 is substantially parallel to the center axes P of the pressure receiving members 3. Moreover, although the reinforcement member 6 is shown in FIG. 8 as a separate member from the suspension support member 2, the reinforcement member 6 can also be integrally formed with the suspension support member 2, as a one-piece, unitary member.

Accordingly, with the vehicle end structure of the present invention, the vehicle body can be provided in which the effect of the collision energy on the cabin C of the own vehicle and the cabin of the vehicle to which the own vehicle is collided can be made extremely small when the collision energy is inputted from the front or rear side of the vehicle.

With the vehicle end structure of the present invention, the surface area receiving the collision energy is increased due to the placement of the pressure receiving members 3, whereby the surface pressure is reduced, and the extent of damage (cabin deformation and the like) to the vehicle to which the own vehicle is collided caused by the collision is also minimized.

Moreover, with the present invention, since the pressure receiving members 3 are arranged as separate members from the suspension support member 2 and are fixedly coupled to the suspension support member 2 by welding or bolt fastening, the pressure receiving members 3 having the appropriate size (length and thickness) according to differences in vehicle overhang or vehicle variation (difference in the amount of collision energy absorbed by heavy vehicles and light vehicles) can be adapted.

Further more, when the crossbar member 4 is coupled to the pressure receiving members 3 as seen in FIG. 5, the pressure receiving members 3 are prevented from being deformed in a direction away from each other (i.e., to the left and right) when the vehicle is subjected to collision. Therefore, the pressure receiving members 3 are ensured to be deformed along the center axes P thereof. Thus, the impact of the collision can be effectively received by the pressure receiving members 3, and the energy associated with the collision can be dispersed.

With the present invention, the deformation structures 3b are provided that extend in the direction orthogonal to the center axis P of the pressure receiving members 3. Therefore, the pressure receiving members 3 are compressed and become easily collapsed when the vehicle is subjected to collision. Thus, the collision energy can be effectively absorbed by the pressure receiving members 3.

Also, in the present invention, each of the pressure receiving members 3 comprises a hollow body formed by a plate bending or folding process and has the joint section 3a in one location. Therefore, the vehicle is prevented from becoming heavy and it becomes possible to effectively absorb the collision energy compared to a case in which two U-shaped members are fitted together so that openings of the U-shaped members face each other.

Moreover, the joint section 3a formed by welding or the like is positioned directly under the front side frame members 1. Therefore, the joint section 3a can be prevented from coming in contact with water and the like, and the anti-corrosion properties thereof can be improved.

Furthermore, when the reinforcement member 6 is coupled to the suspension support member 2, it is possible to prevent breakage and other damage brought about by the collision energy that can be generated when the suspension support member 2 has the curved portions 5, for example.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle end structure comprising:
   first and second side frame members longitudinally extending from proximal end portions located adjacent to a cabin of a vehicle to distal end portions located at a longitudinal end portion of the vehicle;
   a suspension support member disposed below the first and second side frame members adjacent to the proximal end portions of the first and second side frame members; and
   first and second pressure receiving members having proximal end portions coupled to a front end portion of the suspension support member and distal end portions longitudinally spaced from the proximal end portions of the first and second pressure receiving members, respectively, so that the first and second pressure receiving members extend from the front end portion of the suspension support member to the longitudinal end portion of the vehicle in directions substantially parallel to the first and second side frame members, respectively, and so that the distal end portions of the first and second pressure receiving members are substantially vertically aligned with the distal end portions of the first and second side frame members, respectively, as viewed in a vehicle transverse direction, each of the first and second pressure receiving members including a plurality of deformation structures that are spaced apart in an axial direction of the first and second pressure receiving members.

2. The vehicle end structure as recited in claim 1, wherein the first and second pressure receiving members are fixedly coupled to the suspension support member by welding or bolt fastening.

3. The vehicle end structure as recited in claim 1, further comprising
   a crossbar member extending between the first and second pressure receiving members at the longitudinal end portion of the vehicle.

4. The vehicle end structure according to claim 1, wherein the deformation structures are configured and arranged to allow a respective one of the first and second pressure receiving members to deform along a center axis of the respective one of the first and second pressure receiving members.

5. The vehicle end structure according to claim 1, wherein the deformation structures extend in a direction substantially orthogonal to a center axis of a respective one of the first and second pressure receiving members.

6. The vehicle end structure as recited in claim 5, wherein the deformation structures are arranged such that a width of each of the deformation structures gradually decreases from a longitudinal end portion toward the cabin of the vehicle.

7. The vehicle end structure as recited in claim 5, wherein the deformation structures are arranged such that an interval between two adjacent deformation structures gradually increases from a longitudinal end portion toward the cabin of the vehicle.

8. The vehicle end structure as recited in claim 1, wherein each of the first and second pressure receiving members is formed as a one-piece, unitary member.

9. The vehicle end structure as recited in claim 1, wherein each of the first and second pressure receiving members has a closed cross sectional shape.

10. The vehicle end structure as recited in claim 9, wherein each of the first and second pressure receiving members includes a continuous wall section with first and second widthwise edge portions extending substantially parallel to a center axis of a respective one of the first and second pressure receiving members, and a joint section where the first and second widthwise edge portions of the continuous wall section are coupled together to form the closed cross sectional shape.

11. The vehicle end structure as recited in claim 10, wherein the joint sections of the first and second pressure receiving members are disposed directly under the first and second side frame members, respectively.

12. The vehicle end structure as recited in claim 10, wherein the joint section of each of the first and second pressure receiving members is disposed on a top wall surface of a respective one of the first and second pressure receiving members.

13. The vehicle end structure as recited in claim 1, further comprising a reinforcement member coupled to the suspension support member, and configured and arranged to reinforce the suspension support member against a collision energy imparted to the suspension support member through the first and second pressure receiving members.

14. A vehicle end structure comprising:

vehicle end supporting means for supporting a longitudinal end portion of the vehicle with the vehicle end supporting means extending from a proximal end portion located adjacent to a cabin of a vehicle to a distal end portion located at the longitudinal end portion of the vehicle;

suspension supporting means for supporting a suspension with the suspension supporting means being disposed below the vehicle end supporting means adjacent to the proximal end portion of the vehicle end supporting means;

pressure receiving means for absorbing an impact force between the longitudinal end portion of the vehicle and the suspension supporting means with the pressure receiving means extending from a front end portion of the suspension supporting means to the longitudinal end portion of the vehicle in a direction substantially parallel to the vehicle end supporting means such that a distal end portion of the pressure receiving means is substantially vertically aligned with the distal end portion of the vehicle end supporting means as viewed in a vehicle transverse direction; and deforming means for causing the pressure receiving means to deform along a center axis of the pressure receiving means upon the impact force being imparted to the pressure receiving means.

* * * * *